S. SOEDA.
WATER HEATER.
APPLICATION FILED DEC. 17, 1912.

1,077,648.

Patented Nov. 4, 1913.

WITNESSES

F. C. Fliedner
N. B. Keating

INVENTOR
Sadami Soeda,
BY
Francis M. Wright,
his ATTORNEY

UNITED STATES PATENT OFFICE.

SADAMI SOEDA, OF ALAMEDA, CALIFORNIA.

WATER-HEATER.

1,077,648.  Specification of Letters Patent.  Patented Nov. 4, 1913.

Application filed December 17, 1912. Serial No. 737,244.

*To all whom it may concern:*

Be it known that I, SADAMI SOEDA, a subject of the Emperor of Japan, residing at Alameda, in the county of Alameda and State of California, have invented new and useful Improvements in Water-Heaters, of which the following is a specification.

The object of the invention is to provide an improved form of water heater for laundrymen and others who use large quantities of hot water. At present it is the practice to heat a large tank, say 8 feet in diameter and 7 feet high, of water by introducing steam thereinto by means of a pipe discharging directly into the tank. This method of heating, however, is objectionable on account of the loud noise, which accompanies the discharge of steam into the tank. Furthermore, only the upper part of the water in the tank first becomes hot. I have invented a heating apparatus using steam for the heating medium, which is not only free from noise, but in which a large body of hot water of uniform temperature can be obtained in about one-half the time used with the apparatus above referred to.

Figure 1:
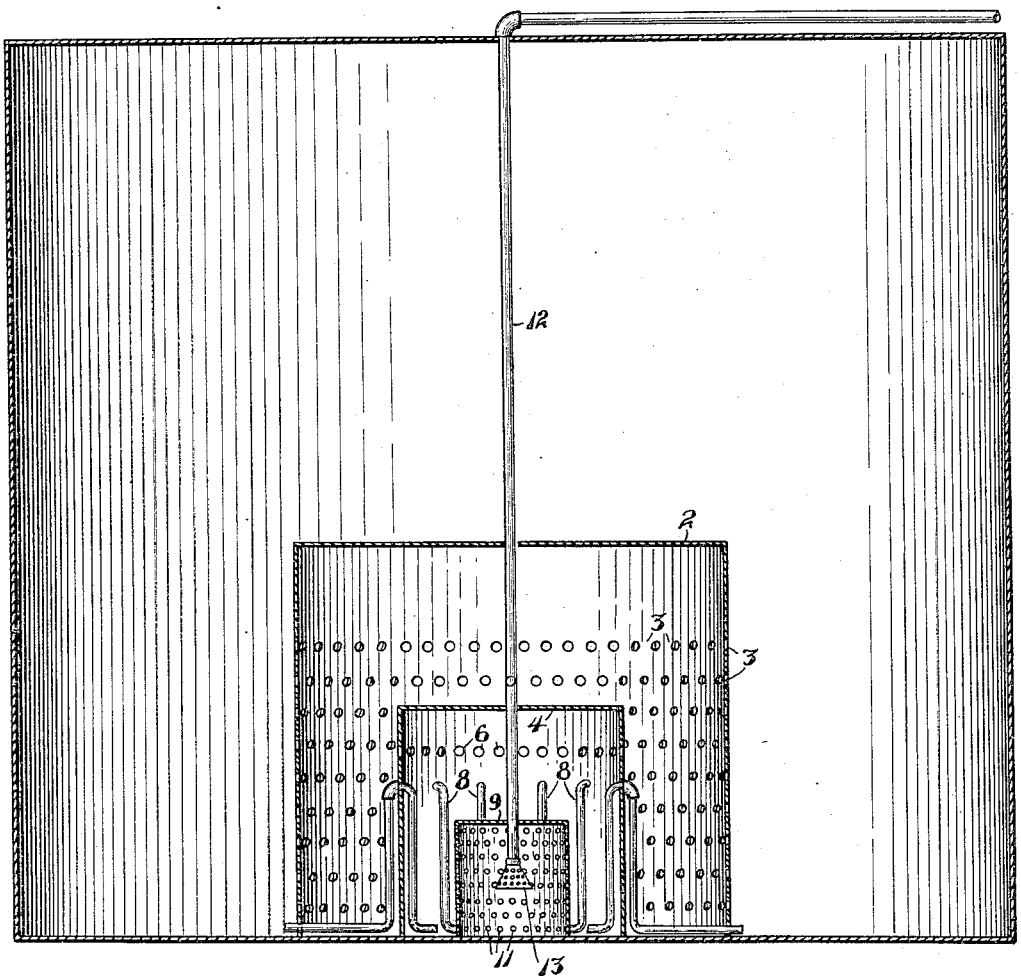
Figure 2:
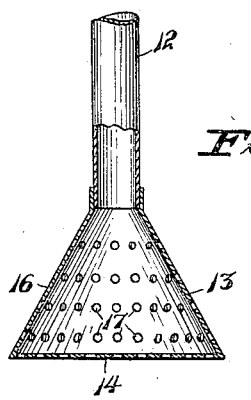

In the accompanying drawing, Figure 1 is a vertical section of a tank equipped with my improved heating apparatus; Fig. 2 is a vertical section on an enlarged scale of a portion of said apparatus.

Referring to the drawing, 1 indicates a tank, preferably cylindrical in form, for containing water to be heated. On the base of this tank at the center is secured a large cylinder 2, closed at the top, the cylindrical wall of which is formed for about three-quarters of its height with a large number of small apertures 3. Secured centrally upon the base within the cylinder 2, is an intermediate cylinder 4, closed at the top, in the cylindrical wall of which is located at about three-quarters of its height, a horizontal row of apertures 6. Through said wall below said apertures extend about ten pipes 8, each pipe leading from a point near the bottom of the tank upward, close to the wall of the cylinder 4, then through said wall, then downward again outside said wall to a point near the bottom of the tank, and then outward and through the wall of the cylinder 2, and within the tank 1. Secured centrally upon the bottom of the tank, within the intermediate cylinder 4, is a small cylinder 9, having a closed top, the whole of the cylindrical wall of which is formed with a large number of perforations 11. A steam pipe 12 leads into the tank 1, and passes downward through the centers of the tops of the cylinders 2, 4 and 9, terminating, at about the center of the cylinder 9, in a conical extension 13. Both the bottom wall 14 and the conical wall 16 of this extension are formed with a large number of perforations 17.

The utility of this apparatus will appear from the following considerations. Since in the ordinary type of heater the end of the steam pipe was freely open to a large body of comparatively cold water, the result was that, as soon as there was a discharge of steam therefrom, the water closely adjacent to the end of the pipe became highly heated, to substantially boiling point, and this boiling water rapidly ascended, and was replaced by cold water, which quickly condensed the steam which attempted to enter the tank from the pipe, so that the water entered the end of the steam pipe and remained therein until it was raised to boiling point, could no longer condense steam, and was discharged by the pressure of the steam. The discharge was therefore intermittent and explosive in character, and caused a loud noise at each discharge, for the reason that the discharge took place only when the pressure of the steam increased sufficiently to overcome the pressure of the head of water in the tank. Immediately after the discharge, the pressure of the steam fell, whereupon the water again entered the steam pipe, and was then gradually forced back therefrom until the steam pressure again became sufficient to overcome the pressure of the said head, whereupon another discharge took place. By forming the end of the steam pipe with an enlarged extension, with small perforations no water can enter said pipe, but there is a substantially continuous discharge of steam therefrom. Also by causing the steam pipe to discharge, not directly into a large body of comparatively cool water, but into a small body of water which is substantially at boiling point, this body of water being separated from the remainder of the water by the cylinder 9, no cold water can come in direct contact with the steam emerging from the steam pipe, but the water which does come in contact with it is of very nearly the same temperature, and consequently there is no condensation of the steam in the pipe, as in the old style of apparatus. Furthermore in said former apparatus, the water raised nearly to boiling point by the escape of steam immediately ascended to the top, and consequently the water at the top only was hot, while the water at the bottom remains comparatively cool. In my apparatus, by the use of the perforated cylinders successively increasing in size, and contained one within the other, such a result cannot occur, but the body of water is uniformly heated.

The intermediate cylinder 4 may be considered as a heater for the cylinder 9, and the object of the arrangement of the horizontal row of apertures 6 in the upper part of the wall of the said cylinder, and of the series of pipes 8, is to promote the circulation of water through said wall, by drawing the cold water from outside the cylinder 2 and inside the cylinder 1 into said cylinder 4, where it is heated by the water at almost boiling temperature issuing from the perforations in the cylinder 9, and flows upwardly and is discharged outwardly through the perforations 6. In this way the body of water in the cylinder 2 is raised to a substantially uniform temperature before it can escape through the apertures 3. On account of the large number of said apertures, it is evident that there can be no great difference in temperature between the water at different portions of the tank 1 outside the cylinder 2. In case the water within the cylinder 4 should become too hot, said pipes 8 provide an outlet for said hot water direct into the tank 1, but said passage of hot water is rendered more difficult by directing each pipe 8 first upwardly and then downwardly as shown in the drawing.

I claim:—

1. In an apparatus for heating by steam a body of water in a tank, a large vessel, secured at the bottom of the tank and having a perforated wall, an intermediate vessel contained within the first-named vessel at the bottom thereof, and having in its wall near the top a horizontal row of apertures, pipes leading through said latter wall and then downwardly, a small vessel within the intermediate vessel, and secured at the bottom thereof and having perforations in its vertical wall, and a steam pipe discharging into said small vessel.

2. In an apparatus for heating by steam a body of water in a tank, a large vessel, secured at the bottom of the tank and having a perforated wall, an intermediate vessel contained within the first-named vessel at the bottom thereof, and having in its wall near the top a horizontal row of apertures, pipes leading through said latter wall and then downwardly, a small vessel within the intermediate vessel, and secured at the bottom thereof and having perforations in its vertical wall, and a steam pipe discharging into said small vessel, and having a flaring extension having small apertures only.

3. In an apparatus for heating by steam a body of water in a tank, a vessel, secured at the bottom of the tank and having a perforated wall, an intermediate vessel contained within the first-named vessel at the bottom thereof, and having in its wall near the top a horizontal row of apertures, a small vessel within the intermediate vessel, and secured at the bottom thereof and having perforations in its vertical wall, a steam pipe discharging into said small vessel, and pipes passing through the wall of the intermediate vessel and leading from the bottom of the tank first upwardly within said wall and then downwardly to a point near the bottom of the tank, and then outwardly through the wall of the large vessel.

In testimony whereof I have hereunto set my hand in the presence of two subscribing witnesses.

SADAMI SOEDA.

Witnesses:
FRANCIS M. WRIGHT,
D. B. RICHARDS.